April 18, 1939.   R. A. SANDBERG   2,155,061
BRAKE LEVER CONSTRUCTION
Filed March 22, 1937   2 Sheets-Sheet 1
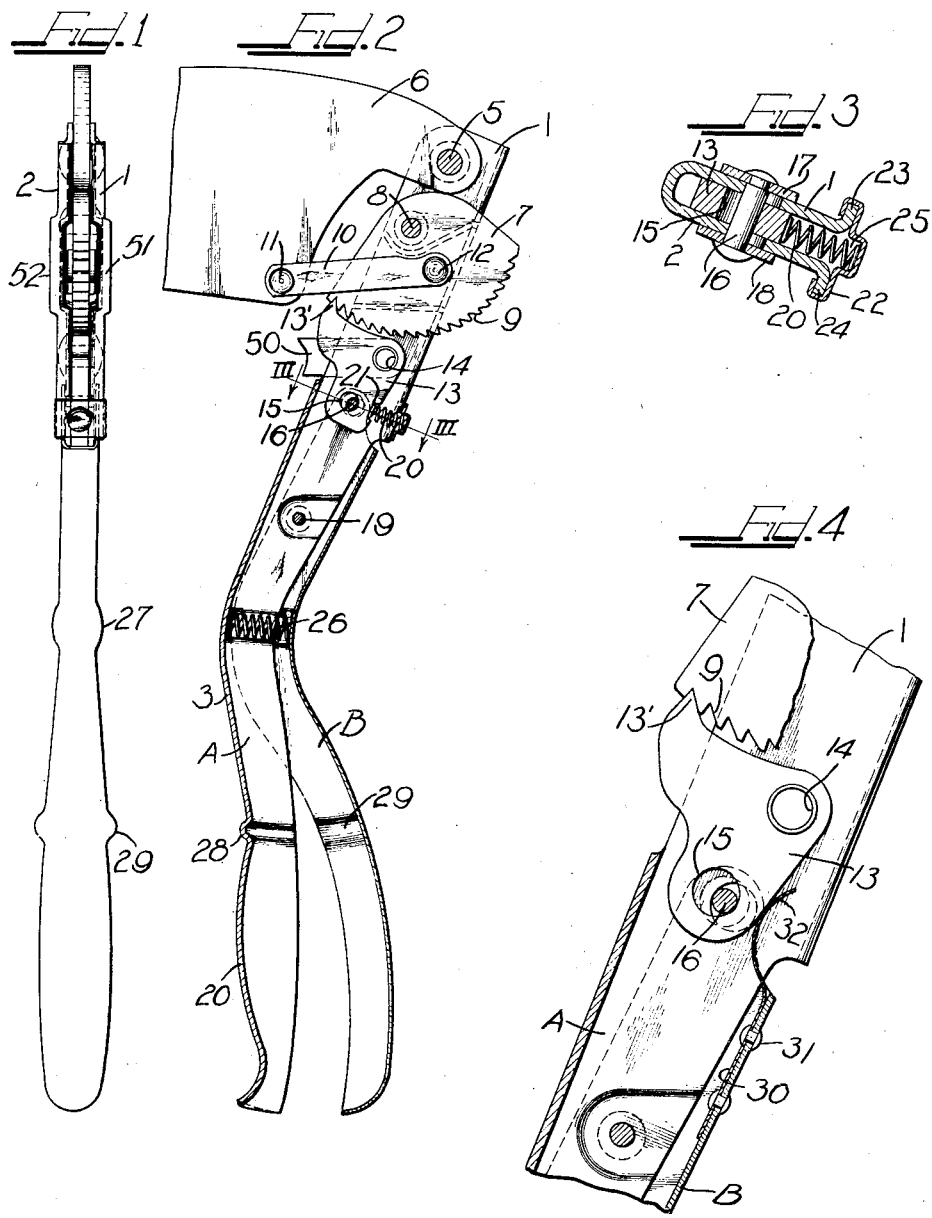
Inventor
RAY A. SANDBERG April 18, 1939.　　　R. A. SANDBERG　　　2,155,061
BRAKE LEVER CONSTRUCTION
Filed March 22, 1937　　　2 Sheets-Sheet 2
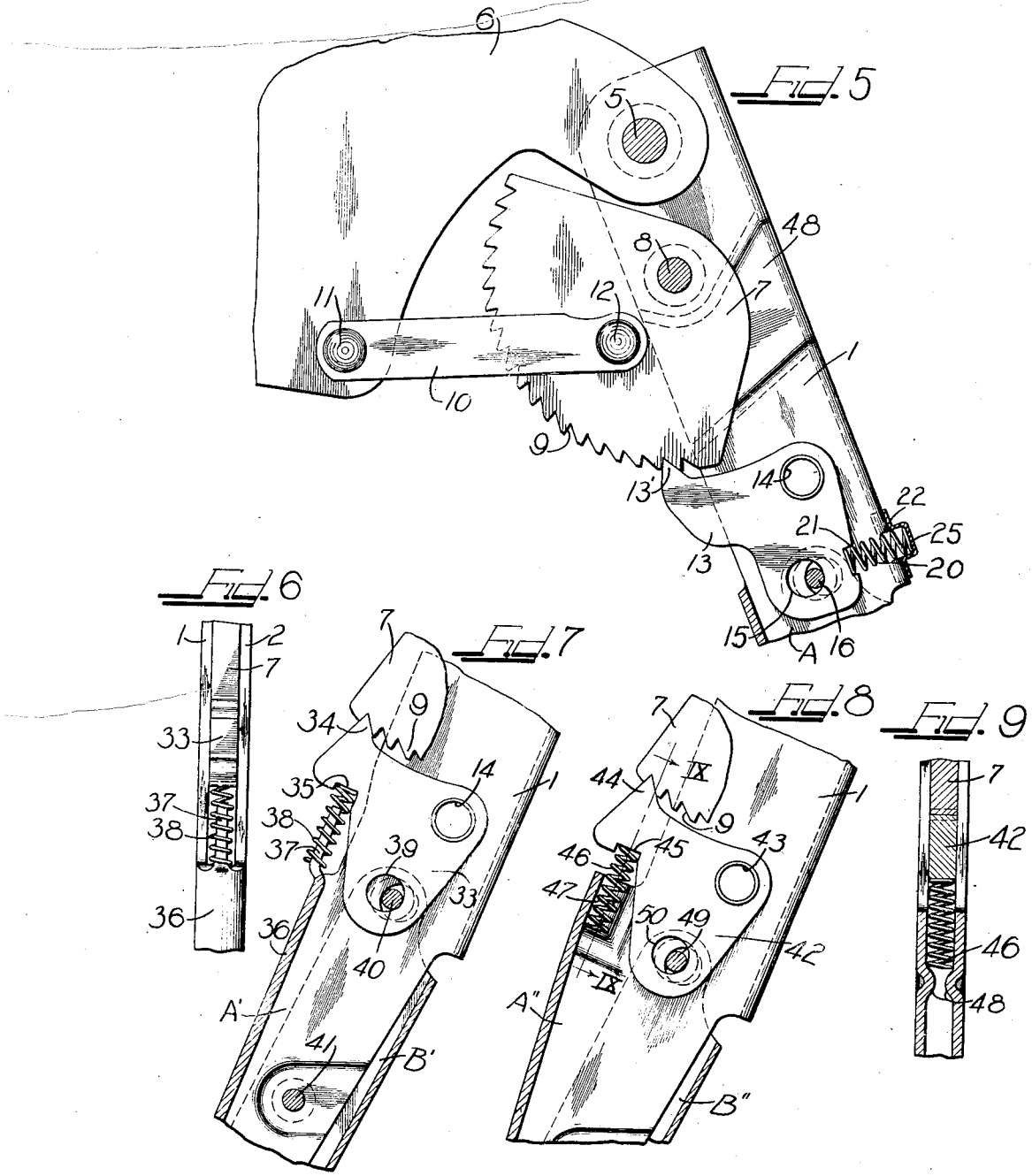
Inventor
RAY A. SANDBERG Patented Apr. 18, 1939

2,155,061

UNITED STATES PATENT OFFICE 2,155,061

BRAKE LEVER CONSTRUCTION

Ray A. Sandberg, Waukegan, Ill., assignor, by mesne assignments, to Houdaille-Hershey Corporation, Detroit, Mich., a corporation of Michigan Application March 22, 1937, Serial No. 132,278

3 Claims. (Cl. 74—537)

This invention relates to brake lever constructions, and more particularly to the ratchet type of lever wherein separate spring means are utilized for maintaining the pawl in latched engagement with its ratchet and maintaining the pawl release means in one position.

An object of the present invention is to provide a control lever of the pawl and ratchet type, having separate and independently acting spring means for retaining the pawl in latched engagement with the ratchet, and the pawl release means in one position.

Another object of the present invention is to provide a control lever of the pawl and ratchet type with a relatively heavy compression spring acting against the pawl release means to maintain the means in one position, and a relatively lighter compression spring acting against the pawl to maintain it in latched engagement with its ratchet.

A further object of the present invention is to provide a control lever of the pawl and ratchet type wherein a relatively light spring is utilized for maintaining the pawl normally in latched engagement with its ratchet, and a heavier spring is utilized for maintaining the pawl-release means in normal or inoperative position, together with lost motion connections between the pawl and the pawl-release means so that the pawl may bounce along the ratchet, when the lever is swung to set the brakes, without imparting any movement to the pawl-release means.

Generally speaking, the invention contemplates the provision of a spring acting directly against the pawl for normally maintaining it in latched engagement with its ratchet, and another spring acting against the pawl-release means to maintain said means in one position.

The above, other and further objects of the present invention will be apparent from the following description and accompanying drawings:

Figure 1 is an elevational view of a brake lever constructed in accordance with the principles of the present invention.

Figure 2 is a view, partially in elevation and partially in longitudinal section, of the brake lever of Figure 1, showing the parts with the lever in "off" position.

Figure 3 is an enlarged transverse sectional view, taken substantially in the plane indicated by the line III—III of Figure 2.

Figure 4 is an enlarged view, partially in elevation and partially in longitudinal section, showing another form of control spring.

Figure 5 is a fragmental view of the lever support, and an elevational view of the interior of one of its legs, showing the lever in set position.

Figure 6 is a fragmental elevational view of the modification of Figure 7, looking at the left hand margin of the lever of Figure 7.

Figure 7 is a fragmental view, partially in elevation and partially in longitudinal section, showing a still further modification of the pawl spring means.

Figure 8 is a view similar to Figure 7, showing another form of pawl spring means.

Figure 9 is a sectional view taken substantially in the plane indicated by the line IX—IX of Figure 8.

The drawings will now be explained.

The form of brake lever herein illustrated is generally of the stamped metal type and includes a lever body member A formed with parallel legs 1 and 2, and which body is channel-shaped for the major portion of its length, with a web 3 and side walls, of which the legs are continuations. The extremities of the legs are apertured to receive a pivot pin 5 for pivoting the lever to a suitable support such as a plate 6.

The lever of Figures 1 and 2 is of the swinging ratchet type, and includes a ratchet sector 7 pivoted to the legs 1 and 2 of the lever at 8, and provided on an arcuate margin thereof with teeth forming a ratchet 9. Links 10 are connected at similar ends to the plate 6 by means of a pin 11 and at the opposite ends to the sector 7 by means of a pin 12. Thus, as the lever is rocked about its pivot, the sector is given oscillatory movement about its pivot 8.

A pawl 13 is pivoted to the lever body A by means of a hollow or tubular pivot 14. The pawl has a point 13' for engaging any of the teeth of the ratchet 9, as is well understood. The pawl is provided with enlarged opening 15 through which passes a pin 16 connected to the ends of the side walls 17 and 18 of the channel-shaped latch-release member B. The latch-release member B is pivoted to the body A by a pivot pin 19 which is disposed nearer the pawl 13 than the grip portion 20 of the lever.

The enlarged aperture 15 in the pawl has its major dimension transversely of the pawl, so that the pin 16 may move in the aperture or so that the pawl may move relatively to the pin as, for instance, when the lever is pulled to apply connected loads, such as the brakes of an automotive vehicle, and the pawl bounces or rides over the teeth of the ratchet 9 without imparting movement to the latch-release member B.

For maintaining the pawl 13 normally in latched engagement with the ratchet, a relatively light compression spring 20 is utilized, with one end bearing against a notch 21 formed in the tail of the pawl and the other end held in place by a metallic cap 22. In the formation of the legs 1 and 2 of the lever body, corresponding margins thereof are outturned as at 23 and 24 for the purpose of strengthening the legs. The cap 22 is provided with a recess 25 for receiving the outer end of the spring 20 and with marginal portions which may be bent over the outturned flanges 23 and 24 of the legs 1 and 2 of the lever body, thus securing the cap in place, as may be readily observed in Figure 3.

The strength or weight of the spring 20 is sufficient to normally maintain the pawl in latched engagement with its ratchet. The provision of the opening 15 in the pawl and the operation of the pin 16 in it constitutes a lost motion connection between the pawl and the pawl-release member B.

In order to maintain the pawl-release member B in one position, which is the normal inoperative position, a heavier compression spring 26 is interposed between the webs of the lever body A and the pawl-release member B, as may be observed in Figure 2. In order to prevent displacement of the spring, the walls of the lever body A and the pawl-release member B may be bulged outwardly as at 27 in Figure 1, thus forming somewhat of a pocket for the spring. It is to be understood, of course, that the spring may be retained in position by other means than the bulging of the walls of the body and release member.

For the purpose of defining the grip portion 20 of the lever body, and also as a guide for the scissors movement of the pawl-release member B, the lever body A is outwardly grooved at 28 and the wall of the latch release member B may be correspondingly recessed at 29 to thus provide interfitting guide means for the latch release member when actuated to release the pawl.

In the form of the invention illustrated in Figure 4, the pawl 13 is maintained in latched engagement with the ratchet by means of a flat spring 30 which at one end is riveted as at 31 to the web of the pawl-release member B and adjacent its other end is bowed as at 32 to bear with its convex face against the pawl, adjacent the pin 16.

In the form of the invention illustrated in Figures 6 and 7, a pawl 33 is pivoted by means of a hollow pivot 14 to the legs of the lever body A'. The pawl is provided with a point 34 for making latching engagement with the ratchet 9 of the sector 7. Adjacent the pointed end of the pawl is a recess 35. A portion of the web 36 of the lever A' extends towards the pawl as a finger 37. Surrounding this finger is a compression spring 38, one end of which engages the notch 35 of the pawl and acts against the pawl to maintain it in latched engagement with its ratchet. The pawl is provided with an enlarged opening 39 in which works a pin 40 carried by the ends of the walls of the brake-release member B', which member is pivoted at 41 to the walls of the body member A'.

In the form of the invention illustrated in Figures 8 and 9, the lever body A'' has a recess formed in it, by suitable stamping operations, which opens towards the pawl 42. The pawl 42 is pivoted by means of a tubular pivot member 43 to the legs of the lever body A'' and has a point 44 for engaging the ratchet 9 of the sector 7. Adjacent the pointed end of the pawl is a recess 45 which receives one end of a compression spring 46, which compression spring is seated in the recess 47 formed in the lever body A''. The lever body is inwardly dented, as at 48 in Figure 9, to bottom the spring 46 and hold it against the pawl 42. In this form of the invention, the pawl-release member B'' is suitably pivoted to the lever body A'' and carries a pin 49 which passes through an enlarged opening 50 in the tail of the pawl in the same manner as described with reference to the pawls 13 and 33.

It will be observed that the lever construction of the present invention provides a relatively light spring for normally maintaining the pawl in latched engagement with its ratchet, and a relatively heavier spring for normally maintaining the pawl-release member in normal or inoperative position, that is, with its handle portion spaced from the handle or grip portion of the lever, as illustrated in Figure 2.

The lost motion connection between the pawl and the pawl-release member, occasioned by the provision of the enlarged opening in the pawl for receiving the release member pin, is such that the pawl may pass over the ratchet teeth without imparting movement to the pawl-release member, a feature which is desirable, as rattling is eliminated.

When it is desired to release the pawl from any engaged ratchet tooth, the operator grasps the handle portion of the lever and that of the pawl-release member B, presses these handle portions together with a scissors action, whereupon the engagement of the latch release pin 16 with the pawl displaces the pawl point from its then engaged ratchet tooth, permitting movement of the lever in released direction.

The legs 1 and 2 of the lever body A are swaged outwardly as at 51 and 52 respectively (Figure 1) to afford room for movement of the pin 12 which connects the links 10 to the sector 7 as the lever is swung in use.

While the invention has been illustrated in connection with a lever embodying an oscillating ratchet sector, it is to be understood that it is adaptable to any type of ratchet and pawl control lever construction.

The invention has been described herein more or less precisely as to details, yet it is to be understood that the invention is not to be limited thereby, since changes may be made in the arrangement and proportion of parts, and equivalents may be substituted, without departing from the spirit and scope of the invention.

The invention is claimed as follows:

1. A control lever in combination, a pawl and a cooperating ratchet for latching said lever in desired position, a spring acting against said pawl to normally maintain it in latched engagement with the ratchet, latch release means pivoted to the lever, said pawl having an enlarged opening in it, a pin connected to said latch release means and passing through the pawl opening and with it constituting a lost motion connection, spring means acting against said pawl release member to maintain it normally in one position, the construction being such that when the pawl release means is in its said one position and the pawl is in latched engagement with its ratchet the pin of the said release member is against a part of the aperture in said pawl ready to unlatch the pawl from its ratchet in the event of movement of the release means from its said one position.

2. A control lever construction including a lever member pivoted to swing, a ratchet, a pawl pivoted to the lever member and oscillatable into and out of latched engagement with the ratchet, said pawl having a hole through it, a release member pivoted to the lever member to rock and having a part overlapping the pawl hole and carrying a pin working within the hole to positively connect the pawl and release member with lost motion connection, said hole being of such size as to permit oscillation of the pawl without causing movement of the pin and release member, a spring normally holding said pawl in latched engagement with the ratchet and a part of the hole margin against said pin, and a spring normally holding said release member in one position, the construction being such that movement of the lever to set position will cause the pawl to oscillate about its pivot as it bounces along the ratchet without causing movement of the pin and release member and rocking movement of the release member away from said one position will unlatch the pawl from the ratchet without any relative movement but that of angular movements of the pawl and release members about their respective pivots.

3. A control lever construction including a lever member pivoted to swing, a ratchet, a pawl pivoted to the lever member and oscillatable into and out of latched engagement with the ratchet, said pawl having a hole through it, a release member pivoted to the lever member to rock and having a part overlapping the pawl hole and carrying a pin working within the hole to positively connect the pawl and release member with lost motion connections, said hole being of such size with respect to the pin as to allow oscillation of the pawl without causing movement of the pin and release member, a spring normally holding said release member in one position, said pin and hole connection constituting a lost motion connection of such characteristics as to render the release member incapable of holding the pawl in latched engagement with the ratchet when the release member is in normal position, and a spring of less effectiveness than said first mentioned spring for normally holding the pawl in latched engagement with the ratchet and a part of the hole margin against said pin, the construction being such that movement of the lever to set position will cause the pawl to oscillate about its pivot as it bounces along the ratchet without causing movement of the pin and release member and rocking movement of the release member away from said one position will unlatch the pawl from the ratchet without any relative movement but that of angular movements of the pawl and release member about their respective pivots.

RAY A. SANDBERG.